US012561177B2

(12) United States Patent
Karve et al.

(10) Patent No.: US 12,561,177 B2
(45) Date of Patent: Feb. 24, 2026

(54) WORKLOAD SUMMARIZATION FOR CONGESTION AVOIDANCE IN COMPUTER SERVERS

(71) Applicant: International Business Machines Corporation, Armonk, NY (US)

(72) Inventors: Alexei Karve, Mohegan Lake, NY (US); Maroun Touma, Redding, CT (US); Kugamoorthy Gajananan, Toshima-ku (JP); Sekou Lionel Remy, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 18/155,095

(22) Filed: Jan. 17, 2023

(65) Prior Publication Data

US 2024/0241770 A1 Jul. 18, 2024

(51) Int. Cl.
*G06F 9/50* (2006.01)
*G06N 5/00* (2023.01)
(52) U.S. Cl.
CPC ............ *G06F 9/505* (2013.01); *G06F 9/5083* (2013.01); *G06F 9/5072* (2013.01); *G06F 2209/5013* (2013.01); *G06F 2209/5019* (2013.01); *G06F 2209/5022* (2013.01); *G06N 5/00* (2013.01)
(58) Field of Classification Search
None
See application file for complete search history.

(56) References Cited

U.S. PATENT DOCUMENTS

| | | | |
|---|---|---|---|
| 8,806,003 | B2 | 8/2014 | Brown et al. |
| 9,588,816 | B2 | 3/2017 | Zhu et al. |
| 10,692,031 | B2 | 6/2020 | Carley et al. |
| 2013/0086273 | A1 | 4/2013 | Wray et al. |
| 2016/0232036 | A1 | 8/2016 | Zhu et al. |
| 2019/0130326 | A1 | 5/2019 | Carley et al. |
| 2021/0126871 | A1 | 4/2021 | Bonas |

OTHER PUBLICATIONS

Jacobson, "Congestion Avoidance and Control", ACM SIGCOMM, vol. 18, No. 4, Aug. 1988, pp. 157-173. (Year: 1988).*
Betz, "Understanding Resource Limits in Kubernetes: Cpu Time," URL: https://medium.com/@betz.mark/understanding-resource-limits-in-kubernetes-cpu-time-9eff74d3161b; Retrieved: Oct. 21, 21 2022; 9 pages.

(Continued)

*Primary Examiner* — Qing Yuan Wu
(74) *Attorney, Agent, or Firm* — Cantor Colburn LLP; Tihon Poltavets

(57) ABSTRACT

Methods, systems and computer program products for workload summarization and congestion avoidance are provided. Aspects include generating a workload summary associated with the workload request responsive to receiving a workload request. Aspects also include detecting potential congestion associated with the workload request by predicting resource usage based on the workload summary and a knowledge base model. Aspects further include performing an action to avoid the potential congestion, the action comprising holding off the workload request for at least a predetermined duration.

14 Claims, 10 Drawing Sheets

(56) References Cited

OTHER PUBLICATIONS

Cremins et al., "Telemetry Aware Scheduling (TAS)—Automated Workload Optimization with Kubernetes (K8s*) Technology Guide," Intel Corporation, Technology Guide, 2022, pp. 1-11.

Dukic, "Leveraging Workload Knowledge to Design Data Center Networks," PhD diss., ETH Zurich, 2021, 166 pages.

Kuribayashi, "Proposed congestion control method for cloud computing environments", International Journal of Computer Networks & Communications (IJCNC) vol. 3, No. 5, 2011, pp. 161-176.

Nunes et al., "State of the Art on Microservices Autoscaling: An Overview," Proceedings of the 48th Integrated Software and Hardware Seminar, Jul. 18, 2021, 9 pages.

Taherizadeh et al., "Dynamic Multi-Level Auto-Scaling Rules for Containerized Applications," The Computer Journal, vol. 62, No. 2, 2019, pp. 174-197.

Tomita, et al., "Congestion control method with fair resource allocation for cloud computing environments", URL: https://ieeexplore.ieee.org/document/6032858, Received: Sep. 6, 2022, 1 page.

Wikipedia, "Automation Summarization," URL: https://en.wikipedia.org/wiki/Automatic_summarization; Retrieved: Oct. 21, 2022, 15 pages.

No Author. "Deployments", Workload Management, Kubernetes, Dec. 31, 2022, 23 Pages.

No Author. "Pods", Workload Management, Kubernetes, Dec. 31, 2022, 8 Pages.

No Author. "StatefulSets", Workload Management, Kubernetes, Dec. 31, 2022, 8 Pages.

* cited by examiner

702
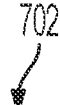

704

span_00001_20190503072356.pcap
  bvlc   frames:24926 bytes:3931541
  llmnr  frames:360 bytes:26306
  nbns  frames:417 bytes:38364
  nbdgm  frames:16 bytes:3740
  dns  frames:160 bytes:13560
  bootp  frames:30 bytes:9688
  data  frames:8076 bytes:713737
  tpkt  frames:19994 bytes:4211892
  dcerpc  frames:6220 bytes:3531980
  nbss  frames:289 bytes:81900
  vnc  frames:1 bytes:60
  llmnr  frames:192 bytes:16776
  dhcpv6  frames:14 bytes:2086
  dtp  frames:24 bytes:2160 span_00001_20190507081327.pcap
  bvlc  frames:26420 bytes:4245760
  nbns  frames:1633 bytes:151280
  ssdp  frames:689 bytes:121889
  dns  frames:223 bytes:18609
  llmnr  frames:600 bytes:47963
  nbdgm  frames:36 bytes:8858
  bootp  frames:35 bytes:12000
  mdns  frames:216 bytes:37028
  data  frames:2 bytes:2156
  data  frames:21578 bytes:3071589
  nbss  frames:319 bytes:90155
  dcerpc  frames:6764 bytes:3821720
  tpkt  frames:21563 bytes:4542086
  tcpencap  frames:13 bytes:6562
  vnc  frames:1 bytes:60
  llmnr  frames:393 bytes:34429
  mdns  frames:58 bytes:8858
  dhcpv6  frames:27 bytes:4023
  ssdp  frames:36 bytes:19806

File level - total accumulated data

| File | Intervals | Frames | Bytes | |
|---|---|---|---|---|
| span_00001_20190503072356.pcap | 363.2 | 78699 | 8552473 | ~712 |
| span_00001_20190507081327.pcap | 393.3 | 107633 | 23881212 | |

Measured data

| File | processingtime | cpu | memory | |
|---|---|---|---|---|
| span_00001_20190503072356.pcap | 83.26 | 1126 | 831 | ~714 |
| span_00001_20190507081327.pcap | 137.402 | 1328 | 1067 | |

FIG. 7

WORKLOAD SUMMARIZATION FOR CONGESTION AVOIDANCE IN COMPUTER SERVERS

BACKGROUND

The present invention relates to computing technology, particularly to workload summarization for congestion avoidance in computer servers.

Enterprises are increasingly moving their Information Technology (IT) infrastructures to the cloud platform, driven by the promise of low-cost access to ready-to-use, elastic resources. Such infrastructures replicate resources and configurations on a target site (i.e., cloud platform), making it challenging to optimize the resource usage (for reduced cost with same or better performance) or cloud-fit configuration (no misconfiguration) after migration. The responsibility of configuring the target environment is often left to the users, who, as a result, may not reap the benefits of reduced cost and improved performance in the cloud platform.

Several systems, such as Kubernetes (also referred to as "k8s") is an open-source container-orchestration system for automating application deployment, scaling, and management. Kubernetes aims to provide a platform for automating deployment, scaling, and operations of application containers across clusters of hosts.

SUMMARY

Embodiments of the present invention are directed to workload summarization and congestion avoidance access. A non-limiting example computer-implemented method includes generating a workload summary associated with the workload request responsive to receiving a workload request. The method also includes detecting potential congestion associated with the workload request by predicting resource usage based on the workload summary and a knowledge base model. The method further includes performing an action to avoid the potential congestion, the action comprising holding off the workload request for at least a predetermined duration.

Other embodiments of the present invention implement features of the above-described method in computer systems and computer program products.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings.

FIG. 7 depicts an example packet capture (Pcap) file and the resulting summarization in accordance with one or more embodiments of the present invention.

The diagrams depicted herein are illustrative. There can be many variations to the diagrams, or the operations described therein without departing from the spirit of the invention. For instance, the actions can be performed in a differing order, or actions can be added, deleted, or modified. Also, the term "coupled," and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Embodiments of the present invention facilitate summarization with resource usage and/or availability in a computing environment to avoid congestion. One or more embodiments of the present invention improve the computing environment, e.g., data center, mainframe, computer server, etc. For example, an edge-based computing platform can communicate with a load balancer for distributing workloads and a module for determining complexity of a workload (summarization). Based on the resource requirements from the summarization function and the current usage from resource metrics, embodiments of the present invention facilitate detecting congestion. Further, based on the congestion detected, embodiments of the present invention facilitate taking responsive actions to alleviate the congestion.

Figure 1:
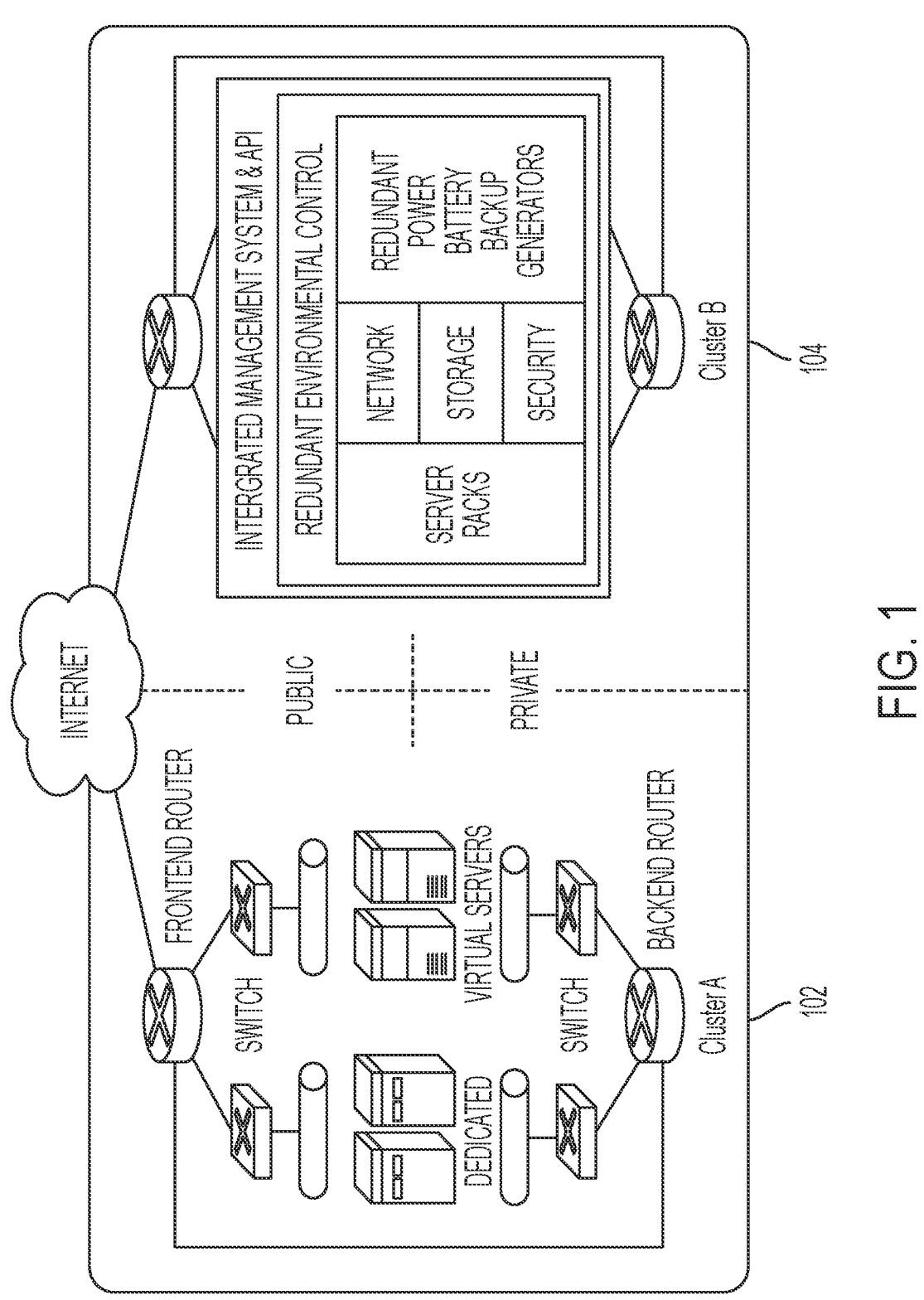
FIG. 1 depicts a block diagram of a computing environment in accordance with one or more embodiments of the present invention.

A cluster (Kubernetes/OpenShift) is a grouping of compute and storage nodes that are interconnected via private networks that run containerized applications in an efficient, automated, distributed, and scalable manner. A cluster can be deployed across multiple datacenters, on-premises, in the public cloud, and at the edge. The nodes can be VMs or bare metal nodes or edge devices. FIG. 1 illustrates an example of a simplified cluster design in data centers with multiple routers and servers. It should be noted, however, that the methodologies of the present disclosure are not limited to applications in such data centers, as the figures are shown for illustrative purposes only.

Pods are the smallest deployable units of computing that you can create and manage in a Cluster (Kubernetes/OpenShift). A Pod is a group of one or more application containers, with shared storage and network resources. The containers within a Pod are always co-located and co-scheduled and run in a shared context. Pods support multiple cooperating processes as containers that form a cohesive unit of service. Sidecar containers are containers that are needed to run alongside the main container. Sidecar containers allow enhancement and extension of the functionalities of the main container without having to modify its codebase.

In such computing environments, such as a data center that relies on receiving and transmitting data via a digital communication network, congestion is the reduced quality of service that occurs when resources are over allocated, i.e., allocated beyond capacity. Congestion may be within a pod or across nodes in a cluster. Memory congestion could result in thrashing and further eviction of pods if more memory than the limit is used, CPU throttling that may require more time for workload execution, use of more temporary storage (cache) than allocated will result in errors, network bandwidth may not allow pushing the data out to persistent storage at desired rate—data may need to be cached on pod longer. This is exacerbated in applications with high ingestion rates.

A pipeline is a sequence of work units performed in stages. Particularly, in edge environments with limited resources on the devices, all stages (phases) of a pipeline running on the edge device(s) are limited to the resources within the edge location. They cannot be dynamically increased as in the cloud (with a cluster autoscaler to increase nodes).

Existing autoscaling solutions to address such technical challenges use system/application metrics to place (add/remove) pods on nodes based on average/maximum resource usage of workload (average/maximum of multiple requests) and thresholds. This works fine for workloads that include requests (or the average based on the sample of types of request) whose requirements do not vary by much. The current state of art collects the time and/or resource usage of a workload request when it is serviced. Here, "Autoscaling" is a cloud computing feature that enables organizations to scale cloud services such as deployments with replicas of pods, server capacities or virtual machines up or down automatically, based on defined situations such as traffic utilization metrics. Autoscaling monitors applications and automatically adjusts capacity to maintain steady, predictable performance at the lowest possible cost. Autoscaling allows to maintain optimal application performance and availability, even when workloads are periodic, unpredictable, or continuously changing.

Scaling can be of several types. "Dynamic scaling" is used to automatically scale capacity in response to real-time changes in resource utilization and is reactive in nature. In OpenShift/Kubernetes, a Horizontal Pod Autoscaler automatically updates a workload resource (such as a Deployment or Stateful Set), with the aim of automatically scaling the workload to match demand. Horizontal scaling means that the response to increased load is to deploy more instances (Pods or Virtual Machines). Vertical scaling would mean assigning more resources (for example: memory or CPU) to the instances that are already running for the workload. If the load decreases, and the number of Pods is above the configured minimum, the Horizontal Pod Autoscaler instructs the workload resource (the Deployment, Stateful Set, or other similar resource) to scale back down.

In another type of scaling, "Proactive or Scheduled scaling" allows to scale the application resources based on known load that will appear in future. This is used to increase the number of instances in advance of known usage patterns in traffic flows and is generally used for situations where conditions include a cyclical traffic, such as high use of resources during regular business hours and low use of resources during evenings and weekends. Alternatively, or in addition, such scaling can be used in anticipation of an upcoming holiday (e.g., Thanksgiving or Cyber Monday sales), anticipation of an event (e.g., a new product release or advertising campaign). Alternatively, or in addition, such scaling can be used in case of recurring on-and-off workload patterns, such as batch processing, testing, or periodic data analysis. Alternatively, or in addition, such scaling can be used in the case of applications that take a long time to initialize, causing a noticeable latency impact on application performance during scale-out events. Thus, proactive scaling is useful when you have regular patterns of traffic increases and applications that take a long time to initialize.

"Predictive scaling" works by forecasting load. It uses machine learning to predict usage of application in future and changes to the resource allocation are made accordingly. Predictive scaling includes collecting data from an instance along with other data points and uses well trained machine learning models to predict expected traffic or usage from daily to weekly patterns. In order to maintain accuracy, the model needs sufficient data, and the data is re-evaluated periodically. It is suitable for those applications that undergo periodic traffic spikes. Cool down period reflects how long it takes for the application to initialize from VM boot time until it is ready to serve the load. Predictive autoscaling includes using this value to start VMs ahead of forecasted load. Predictive scaling might not be useful for those application where traffic cycles are not predictable for those applications which gets random amount of traffic.

In the case of a computing environment like that shown in FIG. 1, technical challenges with scaling includes overcommitting nodes that can lead to excessive evictions, more work for the kubelet and noisy neighbor due to competition for specialized resources (for example Last Level Cache) in ways invisible to Kubernetes/OpenShift. One workload starves another of access to the cache.

Further, in some instances, an application (processing the multiple workloads and corresponding requests) might require more memory or CPU. The computing environment needs to withstand such bursts or occasional spikes. If there are unallocated resources in the Node, the application may use them before returning to the baseline consumption. If the node is low on resources, the pod competes for resources (CPU, network, storage I/O), and the kubelet might try to evict the Pod (because of memory pressure), in some cases.

As described throughout herein, embodiments of the present invention address the technical challenge of congestion by using summarization. "Summarization" is a process of shortening a set of data computationally, to create a subset that represents the most important or relevant information within the original/captured content. For example, in the case of a computing environment that is (potentially) suffering from a congestion, a summarization function scans the workload, and a machine learning/deep learning model determines an estimated usage of resources (substantially) in real time, with minimal use of resources (without necessarily computing the final response/output). The machine learning model to compute estimated usage of a workload request can be computed from historical resource usage of requests and be updated with metrics collected from newer requests.

Accordingly, embodiments of the present invention facilitate to avoid (alleviate) congestion by holding back (exponential backoff with max. backoff time) the workload request from executing when current workloads handled by the pod in combination with the estimate for the new workload is more than the total estimated resource requests handled by the pod. Further, in some embodiments of the present invention, congestion is avoided by processing the workload by running it in multiple passes (tradeoff: increase time but reduce memory usage). Congestion may also include time (as a resource) required to service the request. In some embodiments of the present invention, if the time estimated to complete the workload request exceeds the QoS requirements, the system may partition the workload into multiple simultaneous parallel workloads requests if memory, CPU, storage, network, or other resources are available. Alternatively, or in addition, in some embodiments of the present invention, congestion is avoided by reducing quality based on application toleration (skip certain protocols within the data). Further yet, in some embodiments of the present invention, congestion is avoided by returning an error message (e.g., HTTP 429) indicating that too many requests have been submitted. Such a message can cause the request to be resubmitted by the client after some time if it is still reasonable to do so, otherwise the workload is considered as not accepted (or lost).

Figure 2:
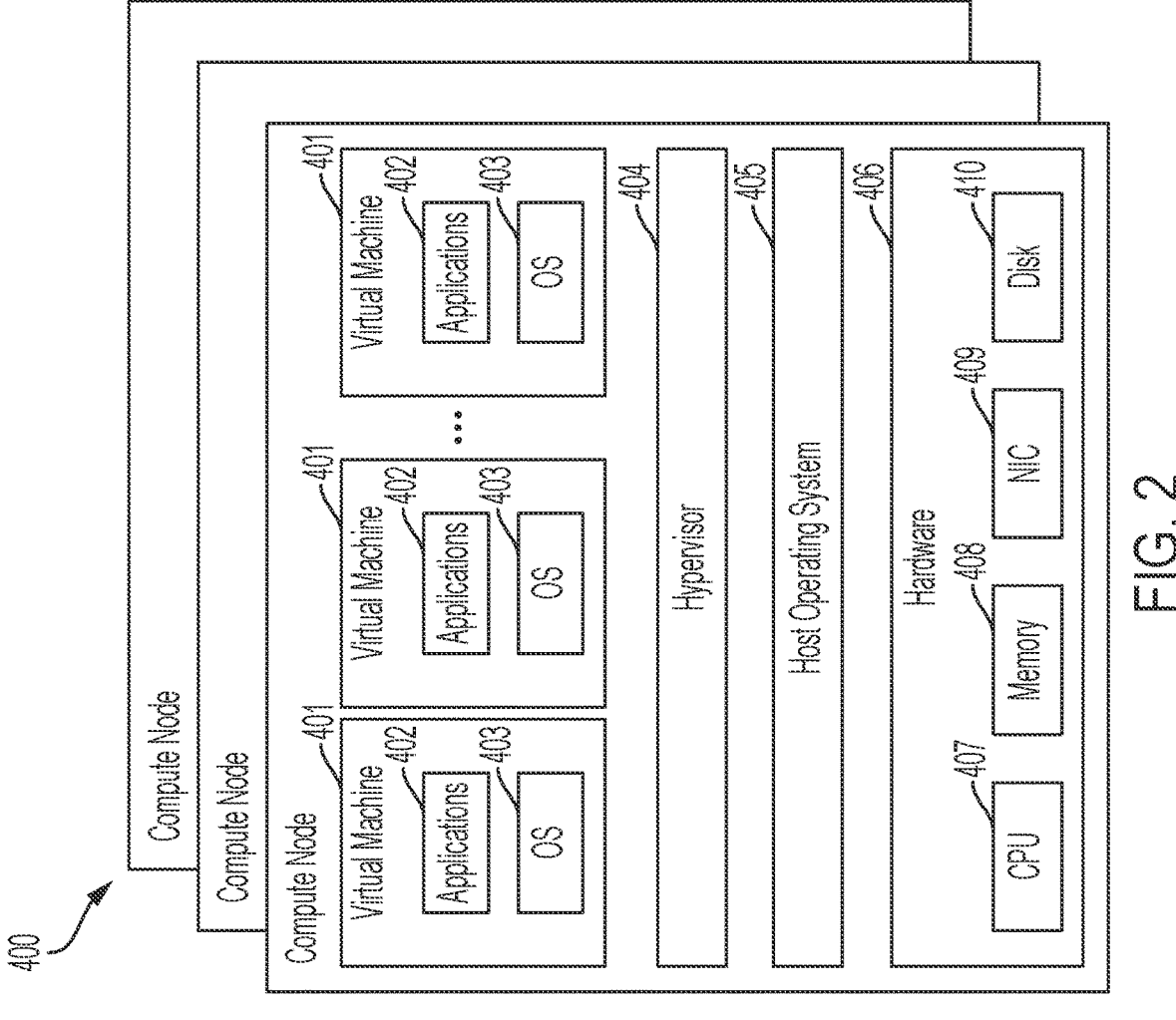
FIG. 2 depicts a block diagram of a compute node in accordance with one or more embodiments of the present invention.
Figure 3:
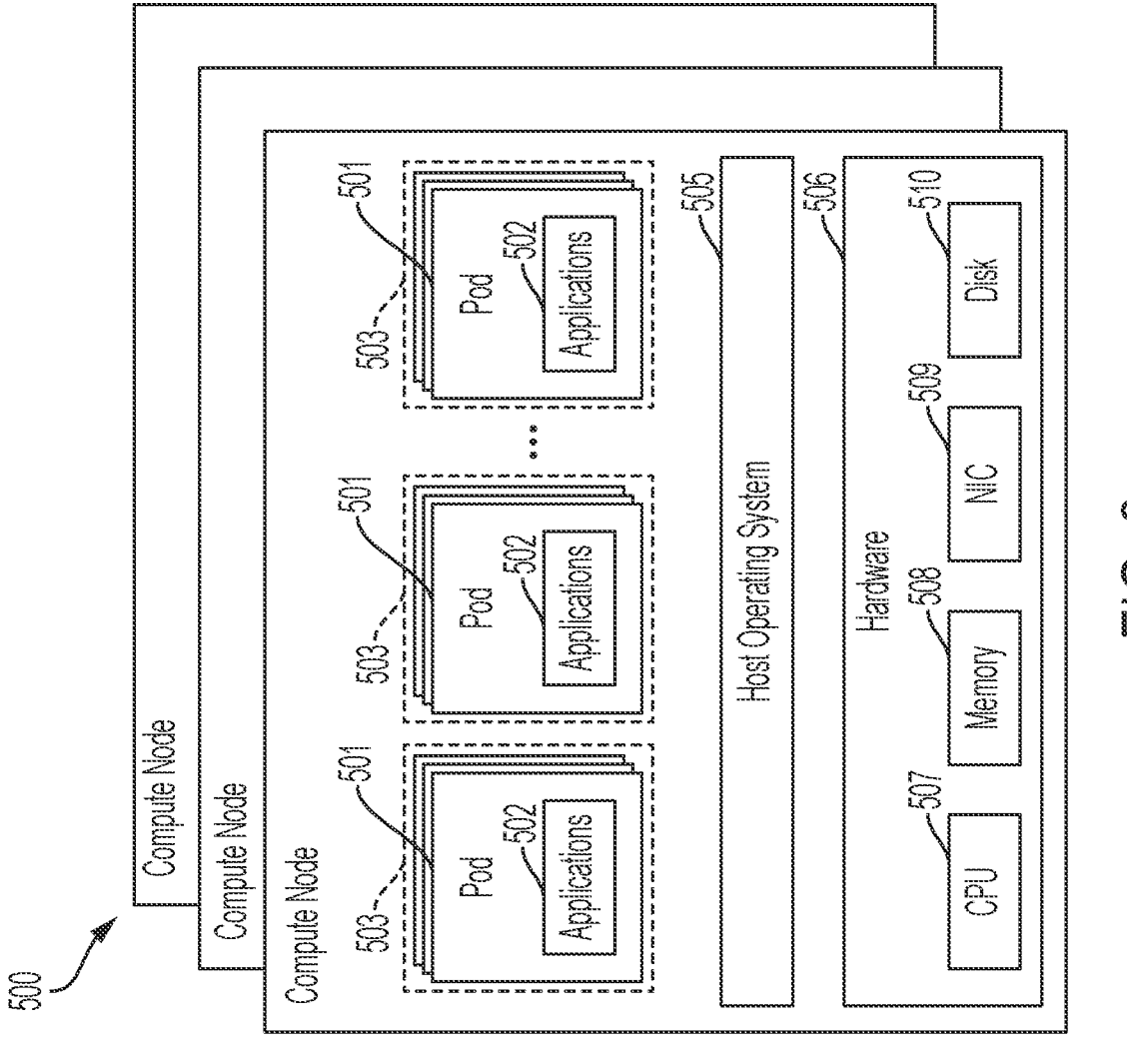
FIG. 3 depicts a block diagram of a compute node in accordance with one or more embodiments of the present invention.

Referring now to FIGS. 2 and 3, a brief description is now provided of a computing environment with a plurality of compute nodes 400 and 500 (also referred to as "host devices"), respectively, that may be used in accordance with some embodiments of the present invention. It is understood that the description is exemplary, and that embodiments of the present invention are applicable in other types of computing environments too.

Figure 4:
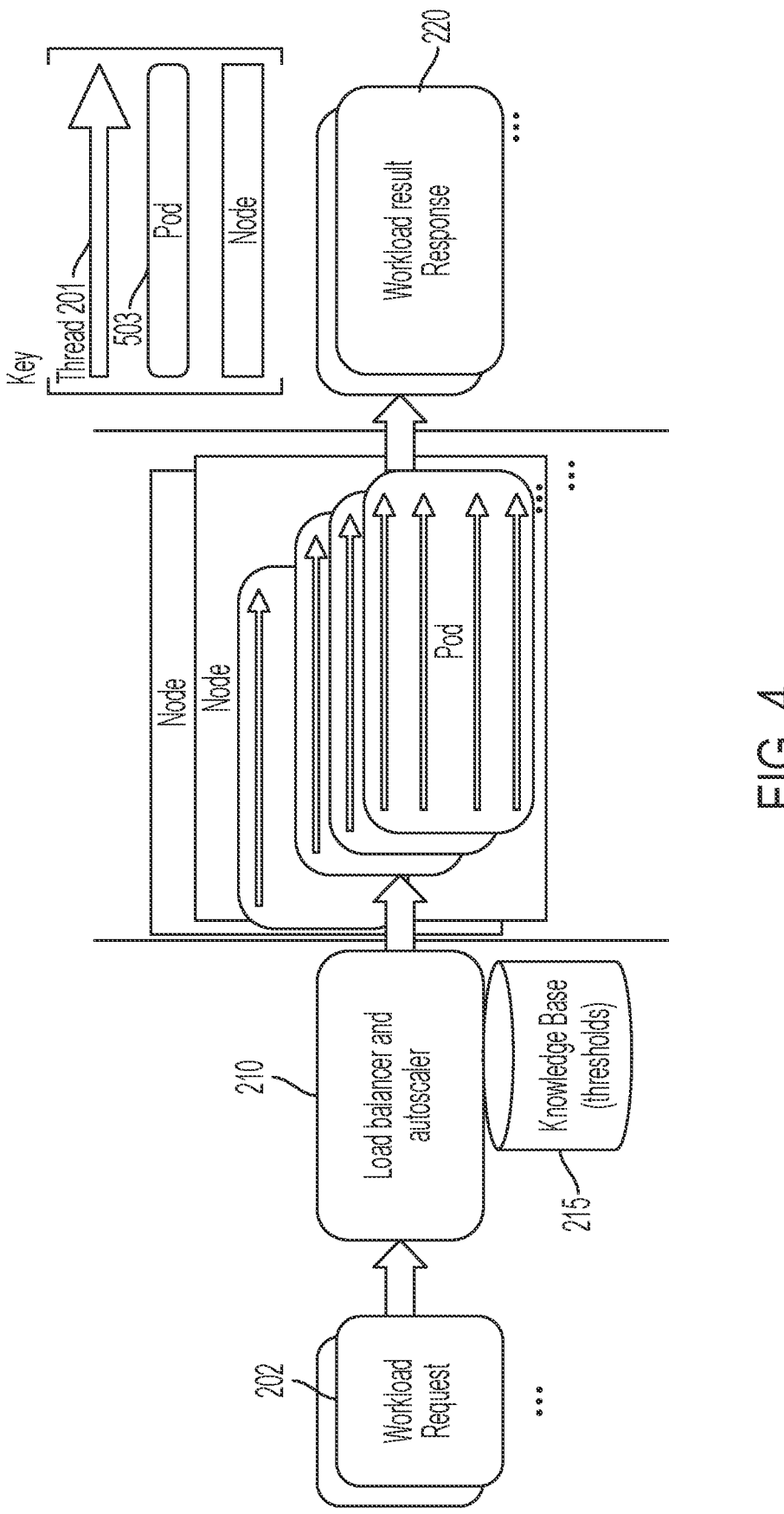
FIG. 4 depicts a block diagram of a compute node in accordance with one or more embodiments of the present invention.

The compute nodes 400 of FIG. 4 include a plurality of exemplary system VMs, or full virtualization VMs, that provide a complete substitute for the targeted real machine and a level of functionality required for the execution of a complete operating system 403. The compute nodes 500 of FIG. 5 include a plurality of exemplary OS-level virtualization systems that allow the resources of a computer to be partitioned via the kernel's support for multiple isolated user space instances, which are usually called containers (multiple containers grouped into pods) and may look and feel like real machines to the end users. Some embodiments of the present invention may be used with several types of virtualization. For example, some embodiments of the present invention may be used with management for virtual machines (such as OpenStack) and management for containers (such as Kubernetes).

For example, container management systems (e.g., Kubernetes, Docker Swarm) may be utilized for managing container lifecycle (Create, Read, Update, and Delete (CRUD) in a cluster-wide system. As a typical example, once a container creation request is received, a scheduler selects the host where requested container will run. Then, an agent in the selected host launches the container. It is to be appreciated that the terms "host" and "node" are used interchangeably herein to refer to a hardware apparatus or hardware system involving at the least, a processor, a memory, and a communication mechanism for interacting with other hosts/nodes.

Figure 5:
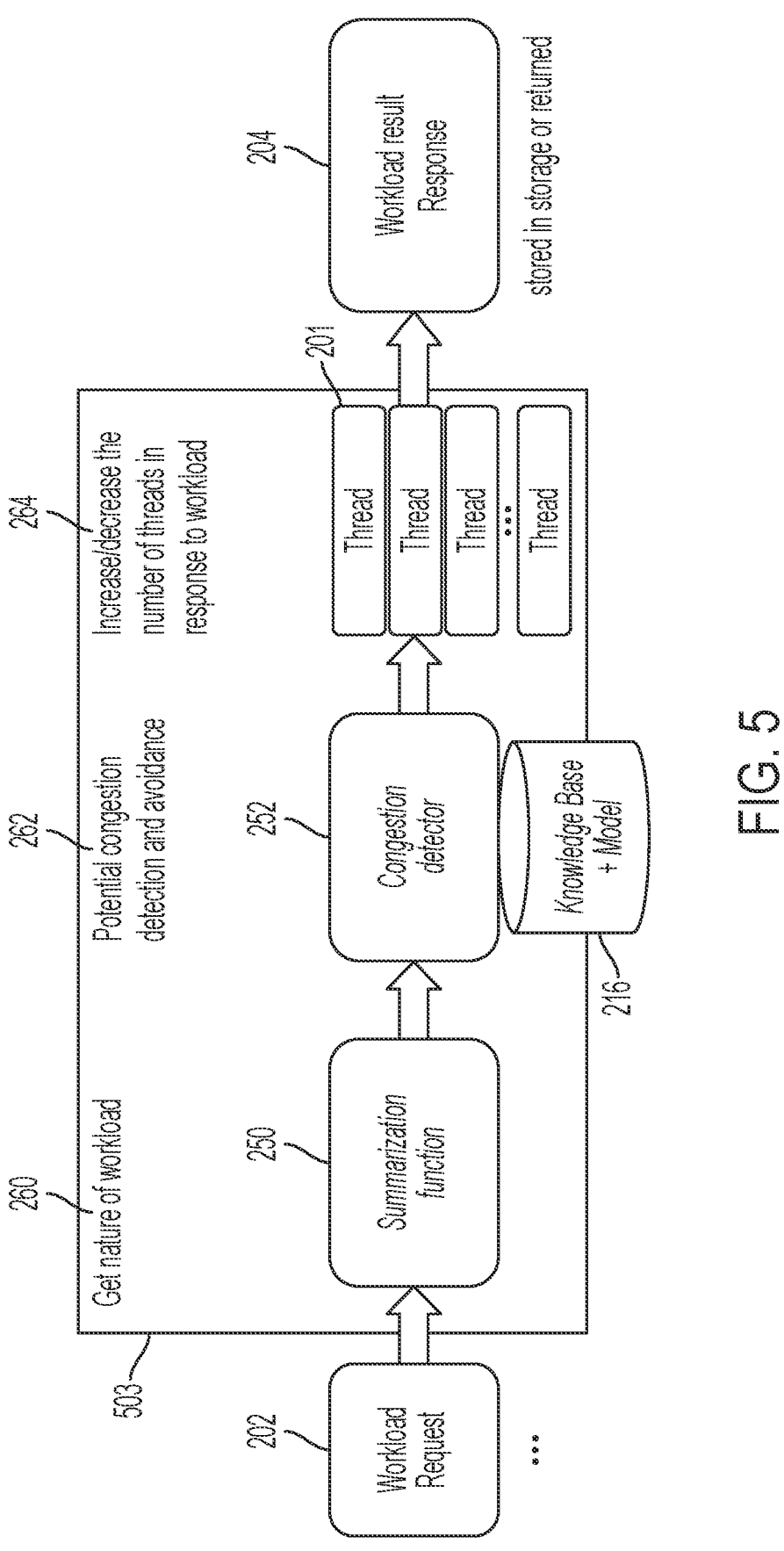
FIG. 5 depicts a block diagram of a compute node in accordance with one or more embodiments of the present invention.

FIGS. 4 and 5 show compute nodes 400 and 500, respectively, using full virtualization and OS-level virtualization. Some embodiments of the present invention may be used with any of these types of compute nodes, as well as in hybrid environments with combinations of these compute nodes across single or multiple compute nodes or clusters.

As illustrated in FIG. 4, each of the compute nodes 400 includes hardware 406 that may include processors (or CPUs) 407, memory 408, network interface cards (NICs)

409, and disk drives 410. The disk drives 410 may include solid state drives or hard disk drives or some combination of the two. On the hardware, the compute nodes 400 run a host operating system 405. The compute nodes 400 also include a hypervisor 404 to share and manage the hardware 406, allowing multiple different environments 401, isolated from each other, to be executed on the same physical machine 400. The hypervisor 404 may use hardware-assisted virtualization, which provides efficient and full virtualization by using virtualization-specific hardware capabilities, primarily from the host CPUs 407. Each compute node 400 includes one or more virtual machines 401 each of which includes a guest operating system 403 and one or more application programs (or applications) 402 running on the guest operating system 403.

Similarly, as illustrated in FIG. 5, each of the compute nodes 500 includes hardware 506 that may include processors (or CPUs) 507, memory 508, network interface cards (NICs) 509, and disk drives 510. The disk drives 510 may include solid state drives or hard disk drives or some combination of the two. On the hardware, the compute nodes 500 run a host operating system 505.

In accordance with some embodiments of the present invention, the compute node 500 may include one or more pods 503 each of which includes one or more containers 501 belonging to applications 502. In Kubernetes, for example, a set of containers constitute a pod.

"Kubernetes" is a portable, extensible open-source platform for managing containerized workloads and services. It facilitates both declarative configuration and automation. The Kubernetes project was open sourced by GOOGLE™ in 2014. Kubernetes orchestrates computing, networking, and storage infrastructure on behalf of user workloads. Kubernetes is an example of an orchestration framework. Other orchestration frameworks include, but are not limited to, DOCKER SWARM™, LXD™, RANCHER™, and APACHE AURORA/MESOS™.

Containerized workload in a plurality of compute nodes may be managed by a container orchestration manager. An example of a container orchestration manager is the Kubernetes Master or Controller.

Several binary components (e.g., master components, node components, and addons) are utilized to deliver a functioning Kubernetes cluster.

Master components provide the Kubernetes cluster's control plane (also referred to as "Kubernetes control plane"). Master components may include, but are not limited to, kube-apiserver, etcd, kube-scheduler, kube-controller-manager, and cloud-controller-manager. Master components make global decisions about the Kubernetes cluster. For example, master components handle scheduling. In addition, master components are utilized in detecting and responding to cluster events. For example, master components are responsible for starting up a new pod when a replication controller's "replicas" field is unsatisfied. Master components can be run on any machine in the cluster. Nonetheless, set up scripts typically start all master components on the same machine, and do not usually run user containers on that machine.

Node components run on every compute node in the Kubernetes cluster. Node components are responsible for maintaining running pods and providing the Kubernetes runtime environment. Node components may include, but are not limited to, kubelet, kube-proxy, and container runtime.

Kubelet is an agent that makes sure that containers are running in a pod. The kubelet ensures that the containers specified in a set of PodSpecs provided through various mechanisms are running and healthy.

Kube-proxy is a network proxy. The kube-proxy enables the Kubernetes service abstraction by maintaining network rules on the compute node and performing connection forwarding.

Container runtime is software responsible for running containers. More specifically, a container runtime is the node component that handles the lifecycle of a container. The container runtime implements basic concepts such as creating, starting, stopping, and removing a container workload. Kubernetes supports several runtimes including, but not limited to, Docker, containerd, CRI-O, and rktlet.

More generally, Kubernetes supports any implementation of the Container Runtime Interface (CRI) provided by Kubernetes. CRI enables a variety of container runtimes to be plugged in easily. Prior to the introduction of CRI in Kubernetes 1.5, only the default Docker image repository was used and its default OCI-compatible runtime, runC. The Open Container Initiative (OCI) created a runtime specification that details the API for an OCI-compatible container runtime. runC, runV, and Intel's Clear Containers (also known as "cc-runtime) are examples of OCI-compatible container runtimes.

CRI runtimes are at a higher level of abstraction and should not be confused with an OCI-compatible runtime. A CRI runtime is also referred to as a "CRI shim." CRI shims include cri-containerd, CRI-O, kata, dockershim, and frakti. Some CRI shims (e.g., cri-containerd, CRI-O, kata, and dockershim) call into an OCI-compatible runtime, while others (e.g., frakti) are a monolithic solution.

At least some CRI shims support multiple runtimes running on a single compute node. For example, CRI-O supports the concept of a trusted and an untrusted sandbox. In Kubernetes, a mix of one or more VM-based pods and one or more cgroup/namespace-based pods may be run on a single compute node based on pod annotations and default CRI-O configuration. Containers running inside a VM-based pod may be isolated and managed via namespaces and cgroups, similar to what is done by runC.

Addons are pods and services that are responsible for implementing cluster features. Addons include, but are not limited to, cluster DNS (i.e., a DNS server which serves DNS records for Kubernetes services), Dashboard (i.e., web-based UI for Kubernetes clusters that allows users to manage and troubleshoot applications running in the cluster, as well as the cluster itself), Container Resource Monitoring (i.e., responsible for recording generic time-series metrics about containers in a central database, as well as providing a UI for browsing the data recorded in that database), and Cluster-level Logging (i.e., responsible for saving container logs to a central log store with a search/browse interface).

FIG. 4 depicts traditional autoscaling (sharing of resources within pods). In the depicted example, concurrency allows multiple threads 201 in each pod 503. Further, multiple pods 503 are executing on each compute node. As noted elsewhere herein, traditional autoscaling facilitates avoiding resource waste by allocating just as much resources as necessary. Further, as noted, there is a variety of autoscaling approaches with diverse characteristics and elements, such as reactive and predictive operations, adoption of machine learning techniques, orchestration frameworks, clusters, etc. Autoscaling works well when the workload response time is fairly even (diverse workloads creates a problem).

When a workload request 202 is triggered, the service request can either be allocated by spawning a new thread 201 in an already existing container or provisioned by spawning a new container instance on a different edge server (i.e., node). Spawning a new thread 201 in an already existing container can lead to added resource contention subsequently resulting in latency requirement violations. Spawning a new container instance on the other hand, can reduce contention amongst resources but is accompanied by the cost of utilizing additional resources such as memory and CPU.

A load balancer and autoscaler 210 can determine a responsive action based on one or more metrics. The metrics can be accessed from a knowledge base 215. The metrics can include average/maximum number of requests/active connections, response time, processed bytes, CPU, RAM, custom metrics, etc. the knowledge base 215 can also include one or more thresholds. In some cases, each metric can have its respective threshold.

In some cases, the load balancer and autoscaler 210 uses horizontal scaling. Accordingly, the load balancer and autoscaler 210 increases or decreases the number of replicas or instances (of the pod 503). When one instance (pod 503) is overloaded with requests it can reduce performance or even causing service instability. A Horizontal Pod Autoscaler (HPA) estimates the number of replicas (i.e., pods 503) needed to satisfy the maximum load peak, always adding enough resources to satisfy this condition (preferably without resource waste).

In some cases, the load balancer and autoscaler 210 uses vertical scaling, and increases or decreases the resources used by a given microservice within its pod 503 replica or instance (requests and limits in kubernetes deployments).

In other cases, the load balancer and autoscaler 210 uses reactive scaling. Here, the system automatically adapts to the requested demand of requests. Knowledge is required when setting thresholds that will support the autoscaling decision and stabilization time to avoid excessive scaling fluctuation.

In the case where proactive/scheduled autoscaling is used, the load balancer and autoscaler 210 scales based on known load that will appear in future. Predictive scaling uses sophisticated techniques to predict future demands to arrange resource provisioning with enough anticipation. Statistical models (gaussian functions and correlation) and machine learning algorithms (regression, genetic algorithms, and neural networks) demand better monitoring metrics and historical information/database.

The above described techniques can cause a pod 503 to be evicted if memory usage of the multiple threads 201 in a pod 503 consume more memory than the limit assigned to that pod 503. Typically, each pod 503 is assigned a maximum amount of memory limit. Further, each pod 503 can be set a limit on the number of threads 201 that can be spawned by that pod 503. Accordingly, in some cases CPU throttling/thrashing is observed if usage of threads is above limit causing requests that are active (in-progress) to slow down further. The load balancer and autoscaler 210 has to be aware of the resource usage and limits of pods allocated to nodes.

Once the workload request 202 has been handled by the pod 503 using one or more threads 201, the workload result response 204 is generated and provided to the requestor. The requestor can be a client device, another application, another computer node, etc. In some cases, the workload result response 204 is sent to a different device than where the workload request 202 originated.

FIG. 5 depicts an operational workflow of a method for workload summarization for congestion avoidance according to one or more embodiments of the present invention.

The congestion avoidance is based on the nature of the workload request 202 within a pod 503. It is not just the average time with average/max resource usage for multiple requests but rather is specific to the current workload request.

Embodiments of the present invention use, a packet capture (Pcap file that contains packet data of a network) associated with the workload request 202 as input. A summarization function 250 identifies (at block 260) a nature of workload associated with the workload request 202 based on the Pcap file. The summarization function 250 identifies several attributes of the workload, such as protocols, frames, number of bytes, etc. The summary of the workload request 202, i.e., the identified attributes is forwarded to a congestion detector 252. The congestion detector 252 detects (at block 262) whether predicted resource usage based on the summary plus ongoing (actual) resource usage can potentially cause a congestion. In the case a potential congestion is deemed, congestion avoidance steps are invoked (at block 264). For example, the congestion avoidance can include an increase/decrease in the number of threads 201 in the pod 503 based on the workload request 202. The adjusted threads 201 operate the workload request 202 and provide the workload result 204.

As a result of the above described method, the workload request 202 is held back from executing immediately until effects of the workload request 202 are analyzed regarding congestion. The analysis, as described, facilitates avoiding eviction of one or more pods 503 because memory limit is not reached because of proactive intervention (holding back/return HTTP 429). By avoiding the eviction, embodiments of the present invention facilitate preventing loss of new workload requests 202 and preventing in progress workloads from being evicted. Further advantages of preventing such evictions include avoiding transfer/copy of data across pods 503, messaging and storage devices thus improving speed of computation. Embodiments of the present invention, in turn, facilitate doing as much work as possible within a pod 503 when data is cached/accessible locally within the pod 503 or in-memory. Because data does not have to be transferred between pods 503, the pipeline takes full advantage of data locality once a workload has been loaded into a cache of the pod 503.

Further, the above described analysis and hold-back in executing the workload request facilitates avoiding CPU throttling because new threads 201 are not started. As a result, embodiments of the present invention avoid use of overallocated resource limits for pods.

In some embodiments of the present invention, the workload request 202 is held back up to a threshold duration (predetermined duration, such as 100 milliseconds, 0.5 second, etc.), and then an error message, e.g., HTTP 429, results. The threshold duration is configurable in one or more embodiments of the present invention. The threshold duration facilitates tolerating fluctuations of the progress rates of the pipeline stages, typically by adding buffer space between stages that can hold a limited number of work units if the stage is currently busy.

Congestion may also include processing time as a resource required to service the workload request. When sufficient memory and CPU resources are available, an increase in the number of threads processing a workload request simultaneously is ensures timeliness for processing the workload. This facilitates increasing concurrency by subdividing/spreading the workload across multiple threads 201 (within and across pods) when resources are available.

The summarization function 250, in some embodiments of the present invention, operates in a separate container (side car container). In some embodiments of the present invention, the congestion detection also operates in a separate container. The summarization function 254 facilitates filtering the input data from the Pcap file to skip certain protocols/frames within the data, allow multiple passes or reduce the data with dimensionality reduction. For example, Principal Component Analysis (PCA) or collecting a representative sample of the elements of a data stream is employed for reducing the resource consumption to within limits assigned to the pod 503. In case of Pcap files, this allows processing of protocols that consume lower memory while other threads 201 are consuming resources. When other threads complete, the rest of the protocols that require higher memory can be completed. Multiple passes increase the service time to process the request but may not over allocate memory. The summarization function 254 may be also used to estimate resource requirements for the filtered data from the workload.

In some embodiments of the present invention, each holdoff of a workload request 202 is used to improve the metrics and model used to determine whether to hold back a subsequent workload request. The metrics and model are stored in the knowledge base 216. Thus, the data capture from each workload request's 202 analysis is used to improve quality for future workload requests 202. For example, if sufficient resources are not available to create additional instances, then increased workload requests 202 stay unprocessed increasing the lag time between phases. This holdoff time or computed lag time can be used as a custom metric to reduce the frequency at which data is being collected (degraded quality) for later workload requests 202.

Figure 6:
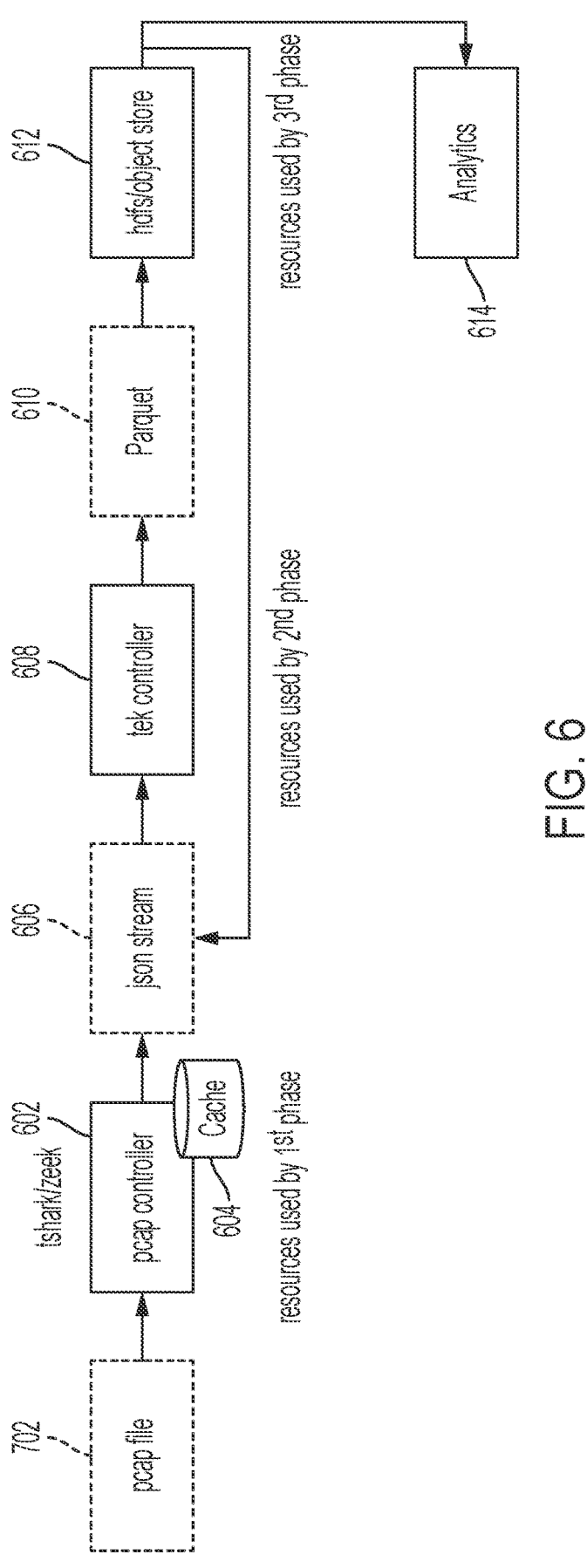
FIG. 6 depicts a flow chart diagram of processing an input data by a summarization function in accordance with one or more embodiments of the present invention.

FIG. 6 depicts processing the input data by the summarization function according to one or more embodiments of the present invention. In the depicted flow of operations, the input data, in the form of a Pcap file is processed sequentially.

FIG. 7 depicts example Pcap files and the resulting summarizations according to one or more embodiments of the present invention. The summaries depicted (712, 714) for respective Pcap files (702, 704) show bytes and number of frames for each protocol and include attributes, such as duration (intervals), frames, bytes, processing time, CPU usage, memory usage. These form the variables for the Knowledge base model 216. In other embodiments of the present invention, different, additional, and/or fewer attributes are possible. Some of the attributes can be measured as the workload request 202 associated with the Pcap file is being executed.

Referring now to the flow in FIG. 6, in some cases, a Pcap controller 602 parses a Pcap file (702, 704) and stores resources used by a first phase of the workload request 202 in a cache 604. A Json stream is generated that includes information about the summarized attributes at 606. The Json stream is processed by a tek controller at 608. The tek controller can analyze the Json stream and convert the results into Parquet data storage format, or any other column-oriented data storage format at 610. The data is further converted into Hadoop Distributed File System (HDFS) objects, at 612. The converted data is analyzed, at 614, and resources used by subsequent phases of the workload request 202 are identified and included in the Json stream being generated at 606.

In some embodiments of the present invention, Kafka queueing may be used at Pcap controller and tek controller. A fixed data approach has a static mapping of data to pods 503. With this approach each thread 201 applies all the pipeline stages to the work unit in the predefined sequence until the work unit has been completely processed. Each pod 503 of a fixed data pipeline would typically take on a work unit from the program input and carry it through the entire program until no more work needs to be done for it, which means pods can potentially execute all of the parallelized program code, but they will typically only see a small subset of the input data. Programs that implement fixed data pipelines are therefore also inherently data-parallel because it can easily happen that more than one pod is executing a function at any time.

Table 1 provides example commands used for the Pcap processing and summarization in some examples used in creating the knowledge base model 216. The duration (intervals), bytes and number of frames for each protocol form the independent variables (variables used for prediction) and the resources like the processing time, CPU and memory form the prediction from the Linear Regression or Random Forest Regression models. It is understood that other commands and techniques may be used to obtain the summarization in other embodiments of the present invention.

TABLE 1

The processingtime, memory, CPU are the outputs from "oc adm top pods"
\# Reuse pods
for filename in /var/nfs/data/PCAP/May__Run/*.Pcap; do echo $filename; time cat
$filename | curl -X POST -H "FileName: $filename" --data-binary @- http://tshark-
deployment.edge-system-health-ocp-cf7808d3396a7c1915bd1818afbfb3c0-
0000.upi.containers.appdomain.cloud/processPcap -H "Content-Type:text/plain"; oc
adm top pods | grep tshark-deployment; echo Done;done > timingsMay.txt 2>&1
echo "File,processingtime,cpu,memory">timingsMay.csv
sed "/Total/,+2d" timingsMay.txt |sed '/var/{N;/\n.*tshark-deployment/{s/\n.*//}}'| sed
'/Processing/,/Processed/d' | sed "/^user/d" | sed "/^Done/d" | sed "/transfer closed with
outstanding read data remaining$/d" | sed "/^sys/d" | sed "/^pod/d" | awk '{ printf "%s",
$0; if (NR % 4 == 0) print ""; else printf " " }' | sed "s/real *//" | sed "s/tshark-
deployment[^ ]* *//" | awk '{split($2,a,"m"); print $1 "," a[1]*60+a[2] "," $3*1 ","
$4*1}'>timingsMay.csv
-----------------------Alternative--------------------
\# Delete and recreate pods
for filename in /var/nfs/data/PCAP/March__Run/*.Pcap; do echo $filename; oc adm top
pods | grep tshark-deployment;time cat $filename | curl -X POST --data-binary @-
http://tshark-deployment.edge-system-health-ocp-
cf7808d3396a7c1915bd1818afbfb3c0-
0000.upi.containers.appdomain.cloud/processPcap -H "Content-Type:text/plain"; oc
adm top pods | grep tshark-deployment; echo Done; oc get pods | grep tshark-deployment
| awk '{print $1}' | xargs oc delete pods;done > timings.txt 2>&1

Table 2 depicts commands for collecting file level accumulated data according to one or more embodiments of the present invention.

TABLE 2 for filename in 'ls /var/nfs/data/PCAP/May__Run/*.Pcap'; do echo $filename;time tshark
-q -z io,stat,0 -r $filename; echo Done; done > framesdurationMay.txt
echo "File,Intervals,Frames,Bytes">framesdurationMay.csv
cat framesdurationMay.txt | grep "0.0 < >\|Pcap" | sed "s/| 0.0 < > /,/"| sed "s/ | */,/g" |
sed "s/,$//g" | sed "s/ |$//"|sed "s|/var/nfs/data/PCAP/May__Run/||" | tr -d '\n' | sed
"s/Pcapspan/Pcap,0,0,0span/g" | sed "s/span/\nspan/g">>framesdurationMay.csv Table 3 depicts commands for collecting file level accumulated data according to one or more embodiments of the present invention.

TABLE 3 for filename in 'ls /var/nfs/data/PCAP/May__Run/*.Pcap'; do echo $filename;time tshark
-q -z io,phs -r $filename | grep '^ [a-z]'; echo Done; done > protocolsMay.txt
echo "File,Protocol,Frames,Bytes"> protocolsMay.csv
cat protocolsMay.txt | sed "s|/var/nfs/data/PCAP/May__Run/||" | awk '/Done/ {print s;
s=f=""} f {s = s $0} /.*span__.*/ {f=1;print $0}' | sed "s/ *frames:/,/g" | sed "s/ *bytes:/,/g"
| sed "/Done/d"| awk '{ printf "%s", $0; if (NR % 2 == 0) print ""; else printf " " }' | awk
'match($0,/[^ ]+ +/){key=substr($0,1,RLENGTH); n=split(substr($0,1+RLENGTH),f,"
*"); for (i=1; i<=n; i++) print $1 "," f[i]}' | awk -f addcolumns.awk | sort >>
protocolsMay.csv

13

Table 4 depicts a method for summing columns with duplicate data according to one or more embodiments of the present invention.

TABLE 4

```
BEGIN {
  FS=OFS=",""
}
{
  keys[$1 "," $2]
  for (i=3; i<=NF; i++) {
    sum[$1 "," $2,i-1] += $i
  }
}
END {
  for (key in keys) {
    printf "%s", key
    for (i=2; i<NF; i++) {
      printf "%s%s", OFS, sum[key,i]
    }
    print ""
  }
}
```

Figure 8:
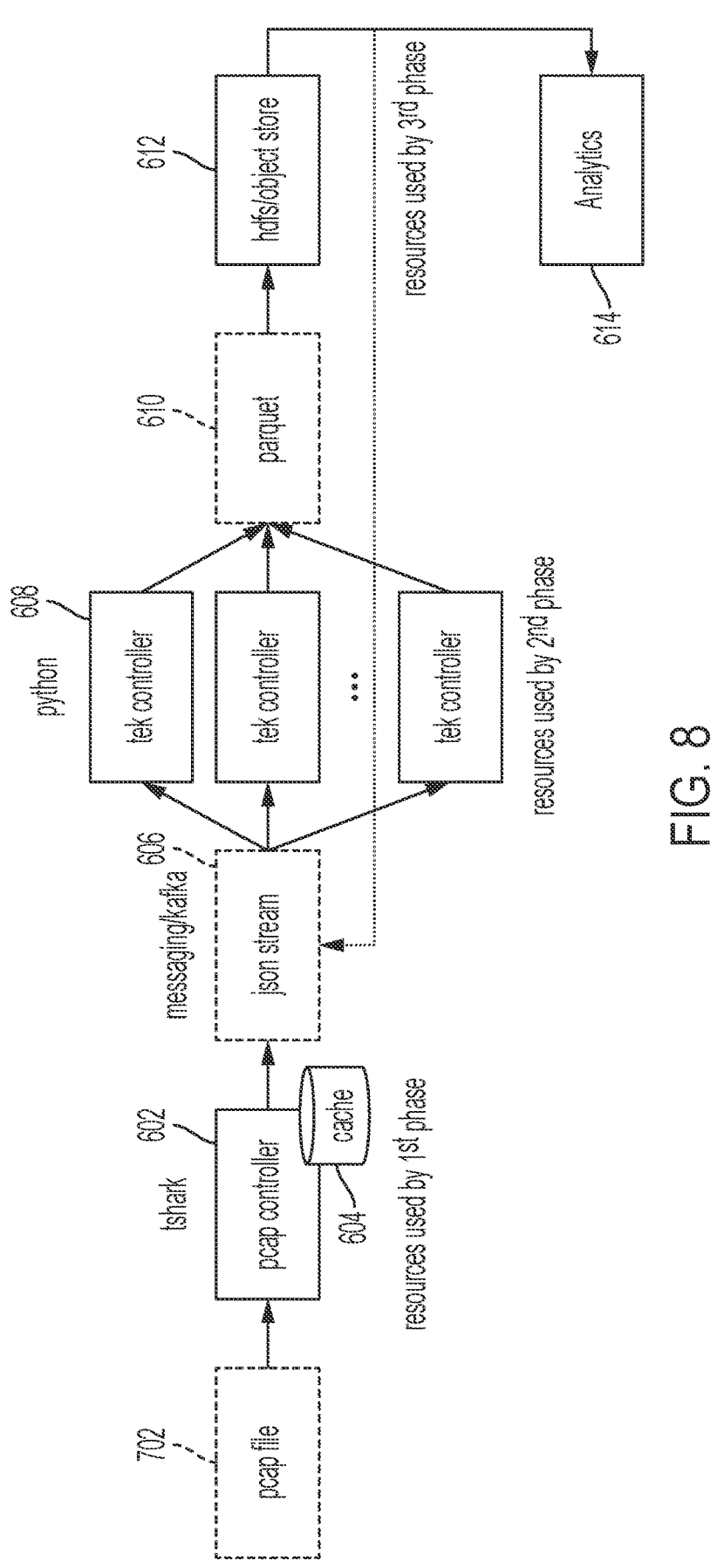
FIG. 8 depicts a flow chart diagram of processing and summarizing a Pcap file in parallel in accordance with one or more embodiments of the present invention.

FIG. 8 depicts an operational flow of processing and summarizing a Pcap file in parallel according to one or more embodiments of the present invention. The Pcap file can be processed in parallel within a pod 503 with multiple threads 201 or across nodes in multiple pods 503. As depicted, each tek controller 608 can be a thread 201 in a pod 503 or a pod 503 in the cluster (across multiple worker nodes). In some embodiments of the present invention, there can be a single tek controller 608, or new tek controller 608 for each Json frame, or some fixed number of tek controllers 608 handling multiple json files (that can be auto scaled).

Figure 9:
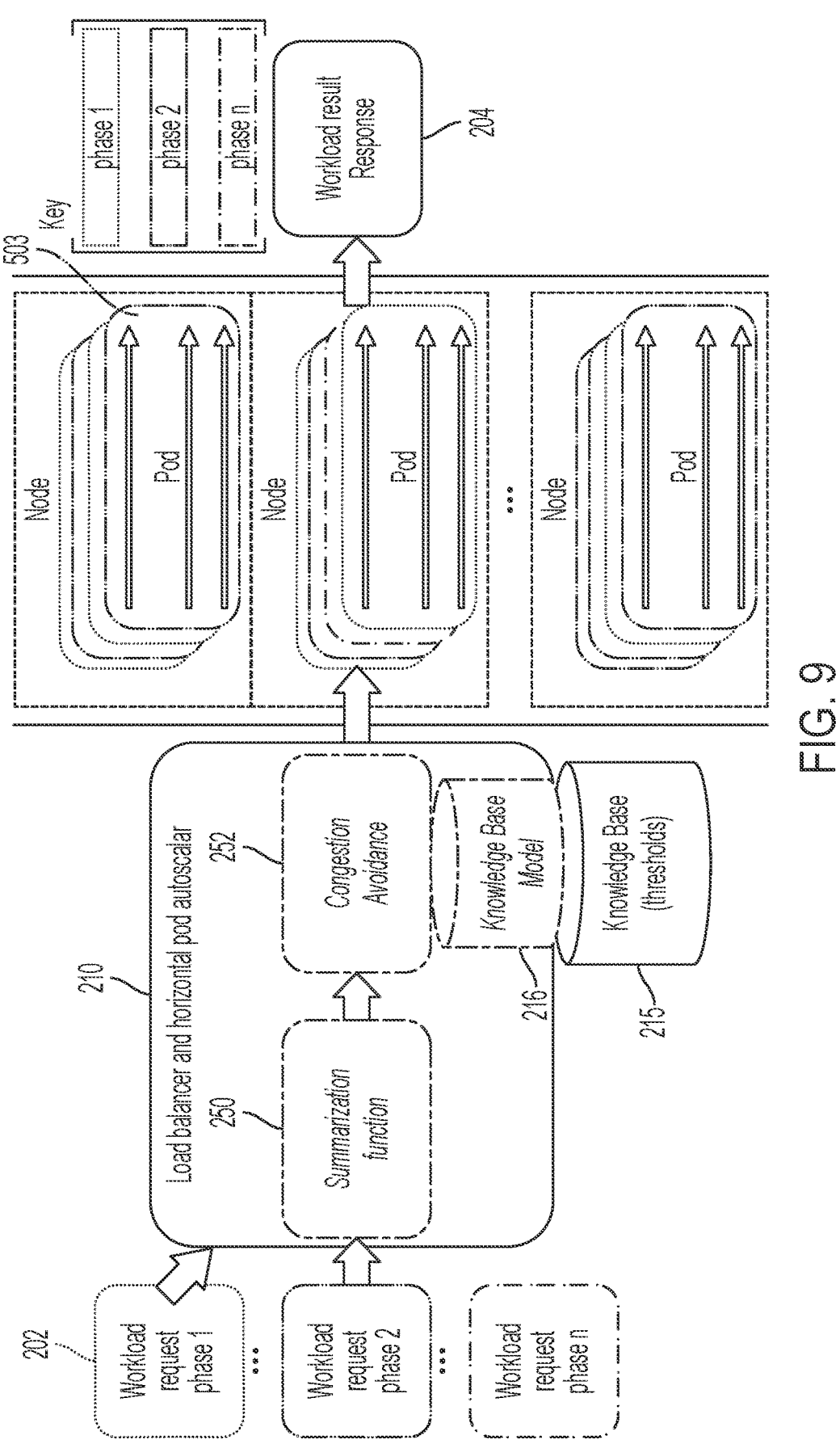
FIG. 9 depicts a block diagram of congestion avoidance in a cluster environment in accordance with one or more embodiments of the present invention.

FIG. 9 depicts congestion avoidance in a cluster environment according to one or more embodiments. Embodiments of the present invention facilitate concurrency which allows multiple threads 201 in each pod 503 and multiple pods 503 in each node. By detecting potential congestion in a cluster environment, embodiments of the present invention facilitate avoiding resource waste by allocating just as many resources (pods 503) as necessary for each phase of an AI pipeline. For example, congestion avoidance is based on the nature of the current phase workload request 202. It is not the average time with average/max resource usage for multiple requests, as noted elsewhere herein.

In the depicted scenario, each workload request 202 is summarized by the summarization function 260. The congestion avoidance in this scenario, based on the summaries of each workload requests 202, can increase/decrease the number of pods 503 across nodes in response to changing load. Additionally, or alternatively, based on the summaries, the congestion avoidance can send new requests to existing pod. Further, as described herein, one or more of the workload requests 202 are held back until resources are available.

Accordingly, embodiments of the present invention prevent exceeding memory limit that makes a container process a candidate for OOM-killing (Out of Memory) and avoid starvation of CPU. A process cannot exceed the set CPU quota, and will never get evicted for trying to use more CPU time than allocated. The system enforces the quota at the scheduler, so the process gets throttled at the limit. If a limit is set but a request is not, Kubernetes will default the request to the limit. This can be fine if knowledge of how much CPU time a workload requires is already available. If a request is set with no limit, Kubernetes is able to schedule a pod, and the kernel ensures it gets at least the number of shares asked for, but the process will not be prevented from using more than the amount of CPU requested, which will be stolen from other process's CPU shares when available. Setting neither a request nor a limit is the worst case scenario: the scheduler has no idea what the container needs, and the process's use of CPU shares is unbounded, which may affect the node adversely.

Embodiments of the present invention address the technical challenges that forecasting techniques are not effective with when the variability in resource requirements between consecutive workloads is greater than a certain pre-defined tolerance. Hence, embodiments of the present invention use inspection and summarization so the resource requirements from one workload request to the next can vary by a large degree. Embodiments of the present invention introspect each workload to predict the requirements of the request so we can avoid overallocation (use) of resources that may cause pod eviction. Embodiments of the present invention are not concerned by profile changes because of season or historical behavior that will provide an average requirement for the application requests, instead every workload request will have characteristics that cause the resource usage to vary widely. In existing techniques, predicted Resource usage is based on monitored data for profiles of workloads (for example, based on uniform resource identifier that distinguishes the request) whereas we predict the resource requirements based on summarization function of the workload request. In embodiments of the present invention, eviction caused by overallocation of resources is avoided by holding back new requests based on predicted usage from a fast introspection of workload requests (not based on profiles).

Further, embodiments of the present invention do not rely on input from a person and do not simulate the workload. Instead, embodiments of the present invention are fully automated based on the summarization of the workload request itself. As examples with Pcap files are shown herein, embodiments of the present invention calculate the estimated complexity of the workload based on three factors including number of bytes, duration in seconds and level of nesting within the payload structure. Embodiments of the present invention, based on such information, avoid pod eviction for pods that are already allocated a subset of resource limits for a workload request.

Accordingly, embodiments of the present invention facilitate accommodating large variation in workload requirements in addition to varied number of requests within the pod instances that are already allocated. This is achieved by running a pre-analysis of the workload request. Using ML, embodiments of the present invention predict the required amount of resources, which could be above the requested resources, and may in fact choose to increase the amount of resources assigned to a given workload in order to prevent it from being vacated and wasteful. In embodiments of the present invention, the resource requirements are variable for each workload request. Embodiments of the present invention do not depend on the average/max historical information for request processing time. Instead, each request is analyzed to determine the resource requirements based on a fast summarization function. Servicing the request is held back until the required resource is available (when previous requests that were in progress are completed) thus avoiding failed requests or modified to adjust to available resources (by filtering or subdividing the workload).

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 10:
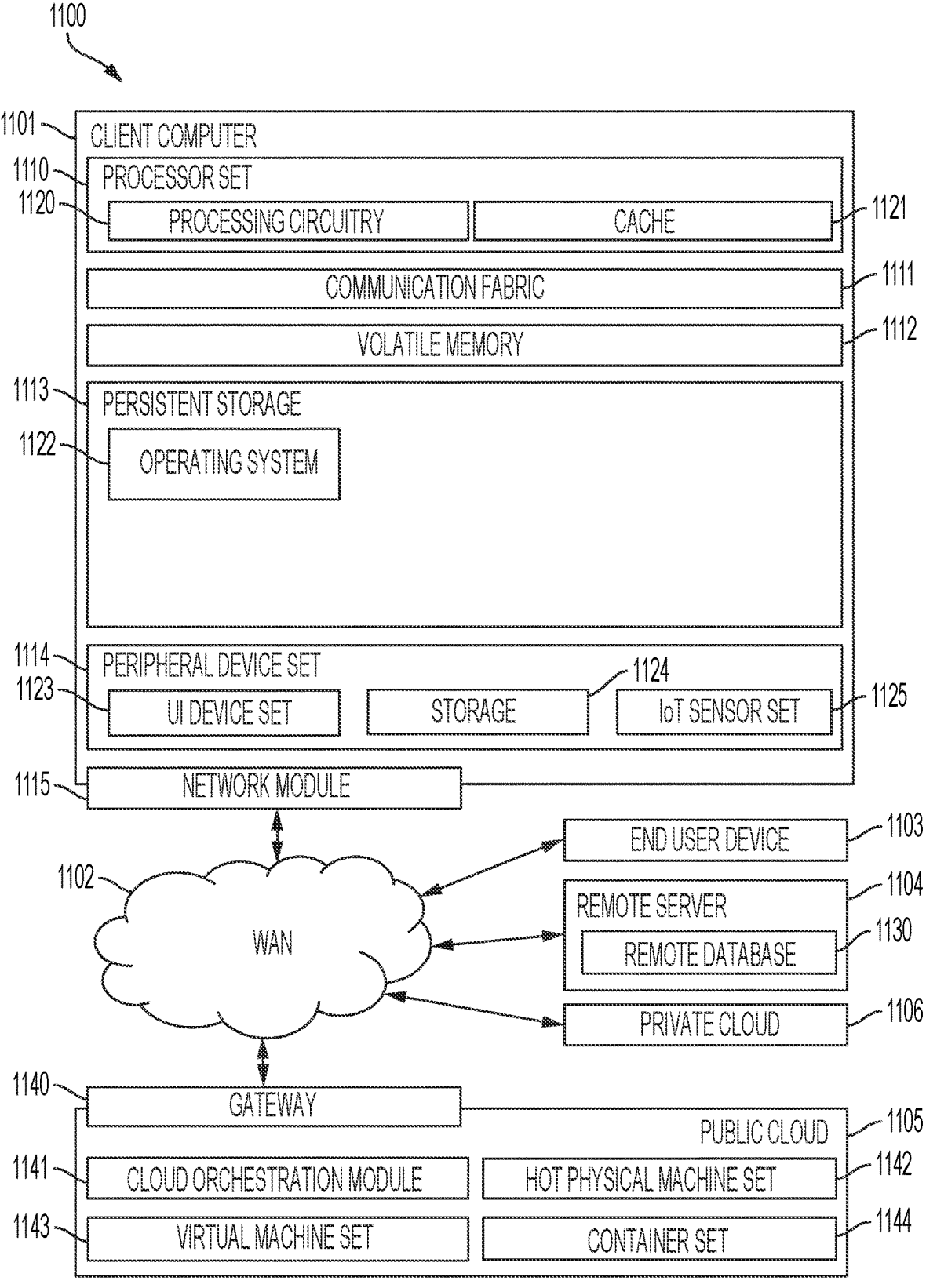
FIG. 10 depicts a computing environment in accordance with one or more embodiments of the present invention.

FIG. 10 depicts a computing environment in accordance with one or more embodiments of the present invention. Computing environment 1100 contains an example of an environment for the execution of at least some of the computer code involved in performing the inventive methods described herein. Computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122, as identified above), peripheral device set 1114 (including user interface (UI), device set 1123, storage 1124, and Internet of Things (IOT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smartwatch or other wearable computer, mainframe computer, quantum computer or any other form of computer or mobile device now known or to be developed in the future that is capable of running a program, accessing a network, or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in several types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 800 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 800 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing exceptionally substantial amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of diverse types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The present invention can be a system, a method, and/or a computer program product at any possible technical detail level of integration. The computer program product can include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for workload summarization and congestion avoidance, the computer-implemented method comprising:

responsive to receiving a workload request, obtaining a packet capture (Pcap) file associated with the workload request and generating a workload summary associated with the workload request by automatically parsing the Pcap file to extract, for each protocol present, a count of frames and a count of bytes;

detecting potential congestion associated with the workload request by inputting the extracted per-protocol frame and byte counts as numeric features into a trained machine-learning model resident in memory to obtain a quantitative prediction of resource usage, including at least one of CPU, memory, or bandwidth, and predicting resource usage based on the workload summary and a knowledge base model; and performing an action to avoid the potential congestion, the action comprising writing the workload request into a delayed-execution queue to hold off the workload request for at least a predetermined duration, wherein holding off prevents pod eviction in a cluster environment.

2. The computer-implemented method of claim 1, wherein the action further comprises reducing data associated with the workload request by using dimensionality reduction algorithm.

3. The computer-implemented method of claim 2, wherein the dimensionality reduction comprises using at least one of principal component analysis (PCA) and sampling.

4. The computer-implemented method of claim 1, wherein the action further comprises down sampling for a subsequent workload request to reduce frequency at which data is collected.

5. The computer-implemented method of claim 1, wherein the workload request comprises a plurality of workload requests, each workload request is from a different phase of a pipeline associated with an artificial intelligence related application.

6. A system comprising:

a memory; and one or more processing units coupled with the memory, the one or more processing units configured to perform a method for workload summarization and congestion avoidance, the method comprising:

responsive to receiving a workload request, obtaining a packet capture (Pcap) file associated with the workload request and generating a workload summary associated with the workload request by automatically parsing the Pcap file to extract, for each protocol present, a count of frames and a count of bytes;

detecting potential congestion associated with the workload request by inputting the extracted per-protocol frame and byte counts as numeric features into a trained machine-learning model resident in memory to obtain a quantitative prediction of resource usage, including at least one of CPU, memory, or bandwidth, and predicting resource usage based on the workload summary and a knowledge base model; and performing an action to avoid the potential congestion, the action comprising writing the workload request into a delayed-execution queue to hold off the workload request for at least a predetermined duration, wherein holding off prevents pod eviction in a cluster environment.

7. The system of claim 6, wherein the action further comprises reducing data associated with the workload request by using dimensionality reduction algorithm.

8. The system of claim 7, wherein the dimensionality reduction comprises using at least one of principal component analysis (PCA) and sampling.

9. The system of claim 6, wherein the action further comprises down sampling for a subsequent workload request to reduce frequency at which data is collected.

10. The system of claim 6, wherein the workload request comprises a plurality of workload requests, each workload request is from a different phase of a pipeline associated with an artificial intelligence related application.

11. A computer program product comprising a memory with one or more computer executable instructions stored thereon, which when executed by one or more processing units cause the one or more processing units to perform a method for workload summarization and congestion avoidance, the method comprising:

responsive to receiving a workload request, obtaining a packet capture (Pcap) file associated with the workload request and generating a workload summary associated with the workload request by automatically parsing the Pcap file to extract, for each protocol present, a count of frames and a count of bytes;

detecting potential congestion associated with the workload request by inputting the extracted per-protocol frame and byte counts as numeric features into a trained machine-learning model resident in memory to obtain a quantitative prediction of resource usage, including at least one of CPU, memory, or bandwidth, and predicting resource usage based on the workload summary and a knowledge base model; and performing an action to avoid the potential congestion, the action writing the workload request into a delayed-execution queue to hold off the workload request for at least a predetermined duration, wherein holding off prevents pod eviction in a cluster environment.

12. The computer program product of claim 11, wherein the action further comprises reducing data associated with the workload request by using dimensionality reduction algorithm.

13. The computer program product of claim 11, wherein the action further comprises down sampling for a subsequent workload request to reduce frequency at which data is collected.

14. The computer program product of claim 11, wherein the workload request comprises a plurality of workload requests, each workload request is from a different phase of a pipeline associated with an artificial intelligence related application.

* * * * *